(12) United States Patent
Nobileau

(10) Patent No.: US 7,347,225 B2
(45) Date of Patent: Mar. 25, 2008

(54) HIGHLY FLEXIBLE MULTISTRUCTURE TUBE

(76) Inventor: Philippe Nobileau, 2 avenue Fernand Martin, Villefranche sur Mer (FR) 06230

( * ) Notice: Subject to any disclaimer, the term of this patent is extended or adjusted under 35 U.S.C. 154(b) by 572 days.

(21) Appl. No.: 10/493,351

(22) PCT Filed: Oct. 23, 2002

(86) PCT No.: PCT/FR02/03642

§ 371 (c)(1),
(2), (4) Date: Sep. 29, 2004

(87) PCT Pub. No.: WO03/036151

PCT Pub. Date: May 1, 2003

(65) Prior Publication Data

US 2005/0087248 A1  Apr. 28, 2005

(30) Foreign Application Priority Data

Oct. 24, 2001  (FR) .................................... 01 14002

(51) Int. Cl.
*F16L 11/00*  (2006.01)
(52) U.S. Cl. ...................... 138/114; 138/119; 138/130
(58) Field of Classification Search ................ 138/131, 138/121, 119, 114, 115, 139, 130, 143, DIG. 5
See application file for complete search history.

(56) References Cited

U.S. PATENT DOCUMENTS

| | | | | |
|---|---|---|---|---|
| 1,022,943 A | * | 4/1912 | Hinsky | 138/124 |
| 2,867,242 A | * | 1/1959 | Harris et al. | 285/114 |
| 2,968,321 A | * | 1/1961 | Kahn | 138/122 |
| 4,592,231 A | * | 6/1986 | Kant | 73/295 |
| 4,674,543 A | * | 6/1987 | Ziemek et al. | 138/153 |
| 4,823,847 A | * | 4/1989 | Grosse et al. | 138/143 |
| 4,953,632 A | * | 9/1990 | Sakaya et al. | 165/104.26 |
| 5,645,110 A | * | 7/1997 | Nobileau | 138/134 |
| 5,813,439 A | * | 9/1998 | Herrero et al. | 138/134 |
| 5,901,754 A | * | 5/1999 | Elsasser et al. | 138/118 |
| 5,927,344 A | * | 7/1999 | Nobileau | 138/114 |
| 6,024,135 A | * | 2/2000 | Nobileau | 138/134 |

\* cited by examiner

*Primary Examiner*—James Hook

(57) ABSTRACT

A multi-structure pipe intended to transport a fluid, used in particular in oil production, including a first hollow and closed tubular structure having a set of substantially circumferential slits, each slit extending on an arc of more than 180° and defining a tension band extending with a helix shape along the said first tubular structure, and at least a second tubular structure having also at least a tension band also in helix shape of the same direction and pitch as the first tubular structure, and the tension bands of the first and second tubular structure being maintained at a fix distance from one another by support of the second tension band on the first tubular structure to provide the tension capacity of the pipe.

12 Claims, 3 Drawing Sheets

HIGHLY FLEXIBLE MULTISTRUCTURE TUBE

TECHNICAL FIELD

This invention relates to large diameter flexible pipes of for drilling and oil production, which are able to withstand high pressure while maintaining great flexibility.

STATE OF THE ART

In oil field production, flexible pipes are used in various applications such as the pipeline. A flexible pipe is herein defined as a pipe which during its transport and its installation is sufficiently flexible along its longitudinal axis to accept a minimum radius of curvature of at least 10 times smaller than that of the rigid tube of the same dimensions. These flexible pipes must be able to withstand high internal pressures that can reach 5,000 to 10,000 psi (35 MPa to 70 MPa). In underwater production utilisation, they must support collapse due to external pressures as well as tension loads during their installation.

Patent EP 871,831 describes a monolithic flexible device comprising a single metallic tubular structure associated to sealed means containing the transported fluid through this tubular structure. The tubular structure is comprised of at least two sets of slits extending along the wall to provide flexibility. Each slit extend in a substantially circumferential direction on an arc smaller than 180°. The space between the set of slits defines at least two tension bands that extend along the tubular structure of the pipe. The set of slits and the bands extend along helix. The arches generated by the slits are also on helixes, but in the opposite direction with a greater helix angle with regard to the axis of the flexible pipe.

The monolithic flexible pipes gain in simplicity compared to the other flexible devices of large diameter available based on the cable technique but the presence of the two bands of tension diametrically opposed on the same monolithic tubular structure generates important plastic deformations in the small pitch arches which links the tension bands in particular when reeled and unreeled for transportation and installation This is due to the small length of these arches, which from the design of the monolithic flexible device cannot exceed a half circumference. Use of this flexible pipe is thus limited to few cycles of reeling/unreeling and must thus be kept to applications known as static where there are none or few alternatives bending in service. The piping interconnexion between oil production components on the seafloor illustrates a static or quasi-static example of flexible pipes where the flexible capability of the pipe is needed only to facilitate its transport, its installation and connections on the seafloor.

Nevertheless, there are needs in particular in riser and the links between the seafloor and the surface where a flexible pipe must be able to support alternate flexion during service that can exceed 15 years. It is thus desirable to improve the monolithic tubular structure described in the patent EP 871,831 to give it acceptable fatigue performances when subject to alternative flexing.

SUMMARY OF THE INVENTION

The object of the invention is to provide a pipe for the fluid transport with a flexibility in the elastic range of the component's material that is greatly improved in order to be able to support alternative flexing while subject to high pressures.

The object of the invention is thus a multi-structure pipe intended to transport a fluid, used, in particular in oil production, including an assembly of tubular structures concentric to the pipe axis and means to contain the transported fluid, the assembly of tubular structures including a first hollow and closed structure having a set of substantially circumferential slits, each slit extending on an arc of more than 180° and defining a tension band extending with a helix shape along the first tubular structure, and at least a second tubular structure having also at least a tension band also with a helix shape of same direction and same pitch that the tension band of the first tubular structure, and the tension bands of the first and second tubular structure are maintained to a fix distance from one another by support between the second tension band on the first tubular structure to provide the capacity in tension of the pipe.

According to a first embodiment of the invention, the flexible pipe is comprised of two concentric tubular structures with slits and the means to contain the transported fluid is a sealed envelope located between the two tubular structures. This sealed envelope can be a metal pipe with a corrugated wall located between the two tubular structures with slits.

According to a second embodiment, the external structure is a tension band, which could be comprised, of several wires on which a low pitch winded tubular structure provides a burst resistance of the flexible pipe.

Last of all according to a third embodiment, the external structure is only a tension band and the means to contain the fluid is located inside the first internal tubular structure. The means to seal is obtained by a thin metal pipe corrugated in helix which can be reinforced for higher external pressure by a carcass of reinforcing profiled wire inserted inside the inside helix groove formed by the corrugations.

DETAILED DESCRIPTION OF THE INVENTION

Figure 1:
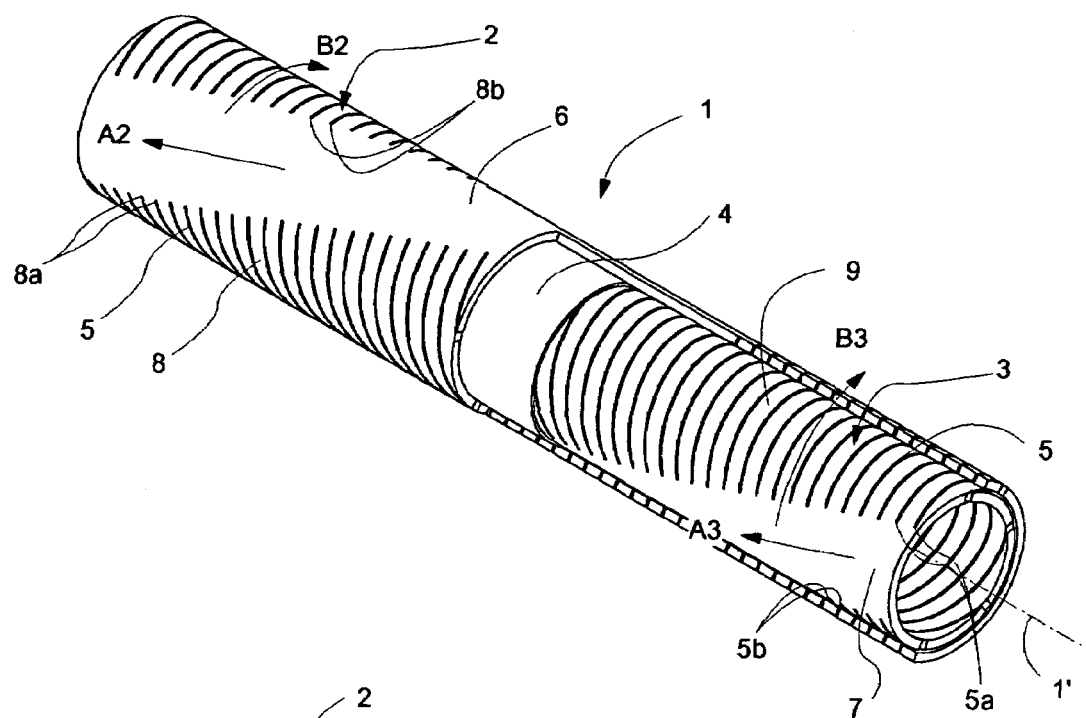
FIG. 1 is a perspective view illustrating a flexible portion of pipe constructed in accordance to a first embodiment of the invention.

While referring to FIG. 1, the flexible pipe 1A has a first internal tubular structure 3 made from a monolithic metal pipe. The tubular structure 3 is cylindrical and comprises a set of parallel slits 5. Each slit 5 has a circumferential length defined by a first end 5a and another opposed end 5b. The length extends substantially more than 180° and preferably between 200° and 300°. The set of slits 5 defines a band 7 that is solid with no slit 5. This band 7 forms a helix with high pitch and small angle of about 10 to 30°. The width of the band 7 is uniform and constant along the central portion of the tubular structure 3. The width of the band 7 extends out on 25 to 45% of the circumference whereas the width of the set of slits 5 covers the remaining portion of the circumference. Arches 9 delimited by slits 5 are preferably on parallel helixes with opposite direction of the helix of band 7. The helix pitch of the arches is low with an angle preferably ranging between 70 and 85°.

In the illustrated embodiment, a sealed envelope 4 surrounds the internal tubular structure 3. This envelope 4 can be made by continuous extrusion of a polymer pipe. An external tubular structure 2 made also from of a monolithic metal tube surrounds the sealed envelope 4. The tubular structure 3 is cylindrical and also comprises a set of parallel slits 5. Each arch 8 also has a circumferential length defined by a first end 8a and another opposed end 8b. The length extends also substantially more than 180° and preferably between 200° and 300°. The ends of arches 8 are linked by a tension band 6 that is solid and has no slits 5. This band 6 forms a high pitch helix parallel and of same angle that band 7. As band 7, the width of the band 6 is uniform and constant along the tubular structure 2. The width of the band 7 also covers 25 to 45% of the circumference whereas the width of the set of slits 5 covers the portion of remaining circumference. This width can be different to the width of the tubular structure 3 but preferably the band 6 section measured on a transversal section to the tubular structure 2 must be substantially equal to the band 7 section measured on a transversal section to the tubular structure 3.

Figure 2:
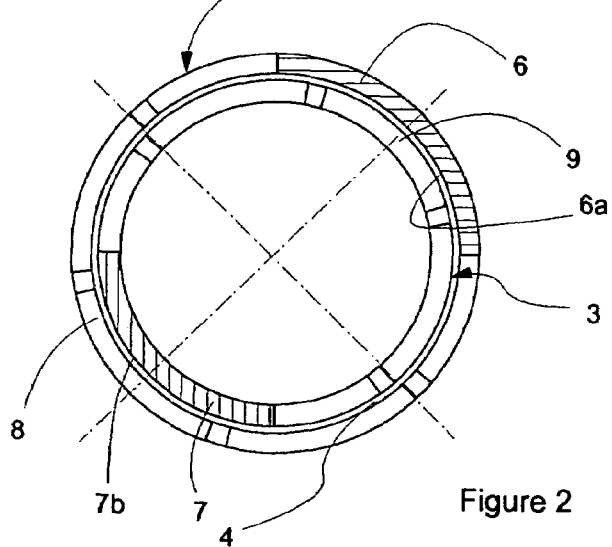
FIG. 2 is a sectional view of the flexible pipe of FIG. 1.

One thus obtains a flexible pipe 1 able to withstand compression or tension loads along its longitudinal axis 1' by interaction of the tension bands 6 and 7 between themselves. Indeed, on FIG. 2 one notes that the tension bands 7 and 6 that have parallel helix are diametrically opposed in order to compensate for the imbalance induced in first tubular structure 3 by the offset of tension band 7. When the flexible pipe 1 is subjected to a tension, this interaction is carried out by contact through the sealed envelope 4 of the interior face 6a of the tension band 6 of the external tubular structure 2 on the arches 9 of the internal tubular structure 3 which are connected to the tension band of tension 7 of the internal tubular structure 3. When the tube is subjected to compression, it is then the outside 7b of the tension band 7 that enters in contact with the arches 8, through the sealed envelope 4, which are connected to the tension band 7 of the internal tubular structure 3. One notes as well as the tension bands 6 and 7 are free to move from one another longitudinally, which gives its flexibility to pipe 1 but are able to maintain a radial interaction in order to avoid a crushing of the tubular structure under simple tension or the buckling of this one when the flexible pipe is subjected to compression. Due to the location of the sealed envelope 4 between the two tubular structures 2 and 3, this envelope is supported on arches 8 when it is subjected to a fluid internal pressure and is supported on arches 9 when it is subjected to a fluid external pressure.

Figure 3:
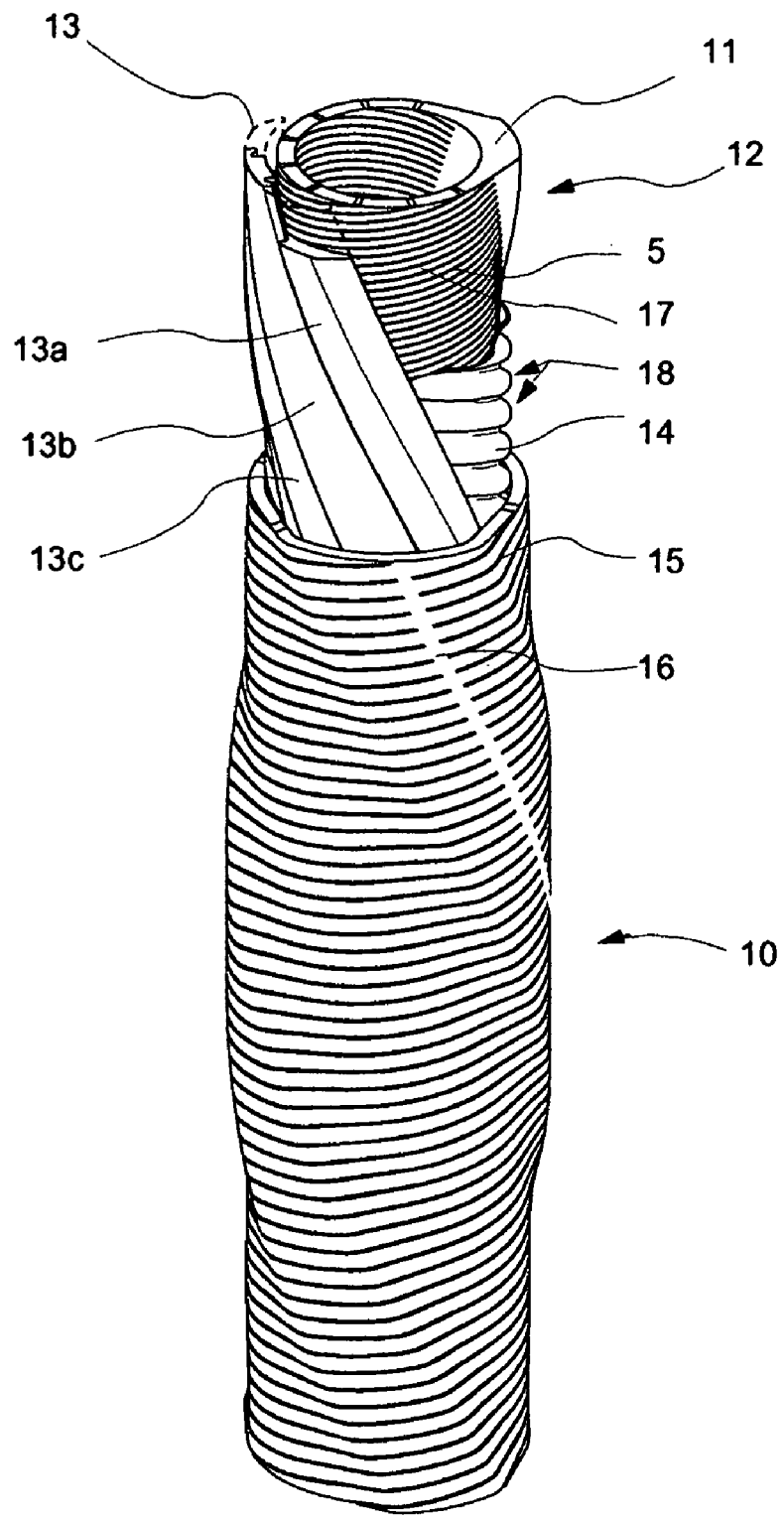
FIG. 3 is a perspective view of a flexible pipe according to a second embodiment of the invention.

On FIG. 3, a second embodiment of the invention is shown. This embodiment is preferred in the case the flexible pipe, according to the invention, will be subjected to very high tension as in the case of flexodrilling drill string. The flexible pipe 10 includes a first tubular structure 12 that comprises a tension band 11 and arches 17 of opposed direction helixes with high and small pitch as for the tubular structure 3. The originality comes from the fact that the tension band 11 is thick in order to be able to support a strong tension although it is of a small diameter. As in the first embodiment, one finds a sealed envelope 14 that is preferably of metal impermeable to fluid and features a corrugated wall 18. Corrugations 18 are preferably on helixes with multiple starts. The external tubular structure is substantially different from the one on the first embodiment of the invention, due to the fact that it does not comprise a monolithic tubular structure. In fact, this one comprises one or more metal wires 13 a, b, c having a total section 13 which will be balanced with section 11 of the tension band of internal tubular structure 12 as it has been previously explained. This tension band 13 is combined with a rectangular wire winding 15 wrapping the tubular structure with the same helix direction that arches 17 of the internal tubular structure 12. These wires 15 can be either metal or high performance reinforcing fibbers (glass, aramid, carbon) in a hollow metal envelope. These wires can be connected between themselves and possibly to the tension band 13 at the location 16.

Thus, one obtains a tubular structure with high performance easy to produce, on continuous line, by winding and welding the edges of a sealing band 14 with a very high pitch on the internal tubular structure 12, then winding the tension band(s) 13 with the same high pitch with the same direction as the tension band 11 followed at last by the winding of the wire mesh 15 resistant in hoop with small pitch and in the opposite direction of the tension band 11. Since the configuration of the sealed envelope 14 again between the two tubular structures 12 and 13-15, this envelope is supported by the winding of wire 15 when subjected to a fluid internal pressure and is supported on the arches 17 of the internal tubular structure 12 when subjected to a fluid external pressure.

Figure 4:
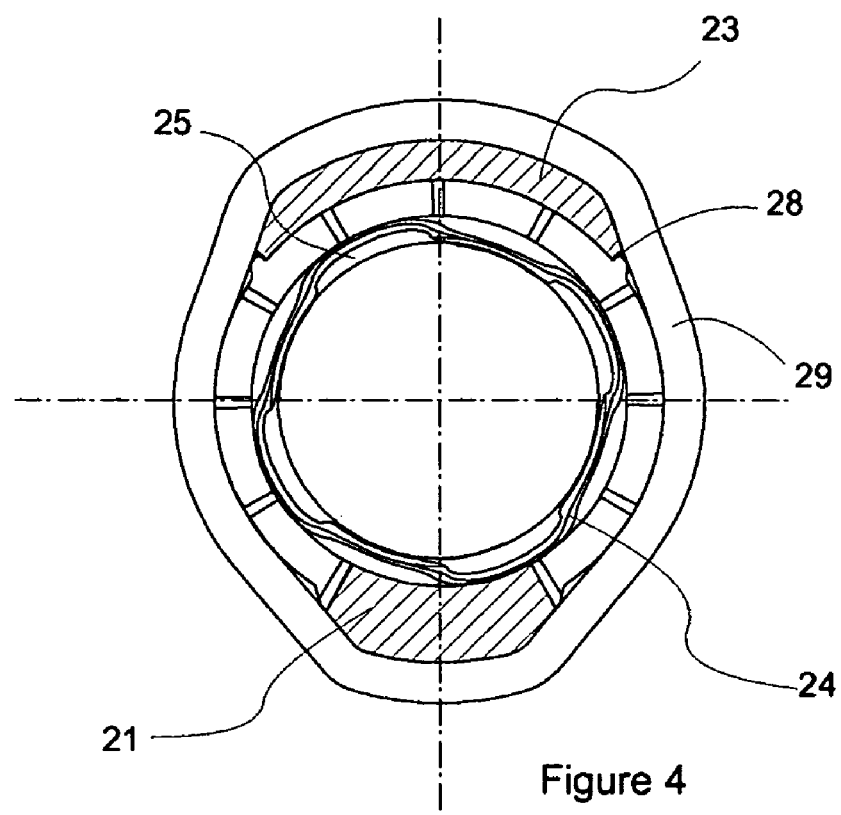
FIG. 4 is a sectional view of a flexible pipe according to a third embodiment of the invention.
Figure 5:
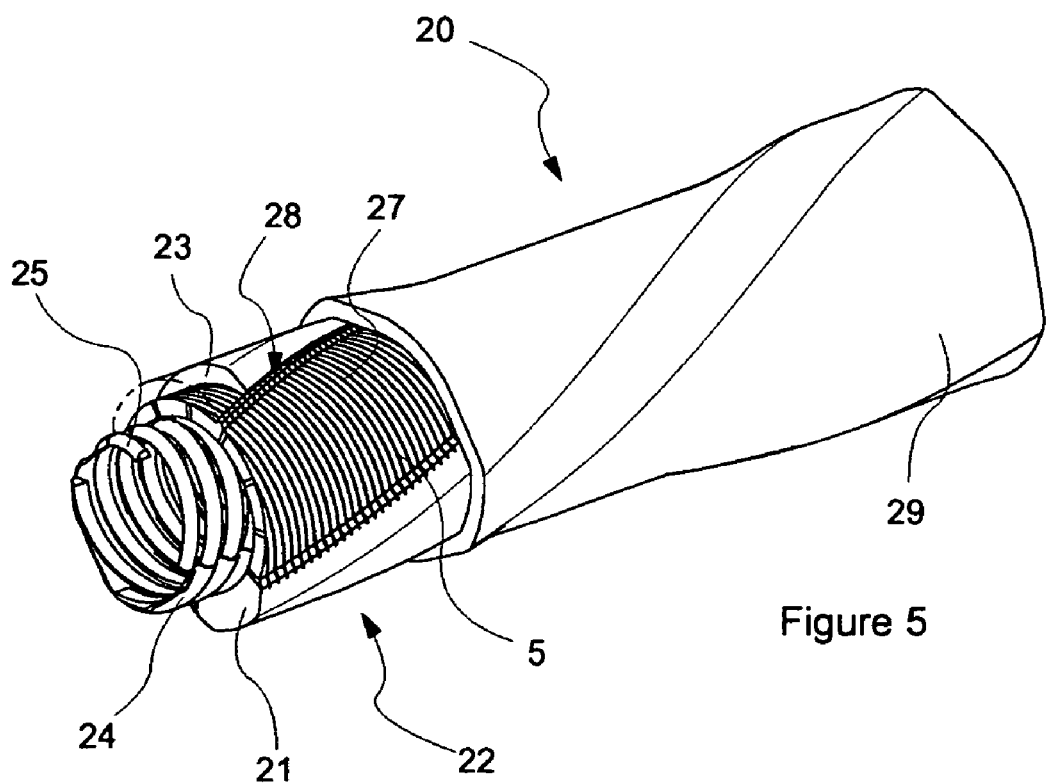
FIG. 5 is a perspective view illustrating a flexible pipe shown in a sectional view on FIG. 4

FIGS. 4 and 5 illustrate a third embodiment of the invention, which will be preferred for, cost saving reasons when external pressure or compression services are low. Nevertheless, one finds the first monolithic tubular structure 22 with its single tension band 21 and its arches 27. On the other hand, the sealed envelope, preferably out of corrugated thin pipe 24 is laid out inside the first tubular structure 22. This makes it possible to use arches 27 to resist the external pressure and to avoid having to wind another structural mesh to take care of this as per the two preceding embodiments. It is now necessary to have only one or more tension band(s) 23 to balance the flexible pipe. To avoid lateral displacement of the tension band 23 when sliding, stops 28 are located on arches 27 of the first tubular structure. An outer jacket 29 is installed to isolate the tubular structure from the external environment.

To improve the resistance in external pressure of the corrugated thin metal envelope 24, a reinforcing helix shaped wire 25 can be inserted inside the helix fold formed by the corrugations.

The invention offers significant improvements for the tubular structure of flexible pipes. The first tubular structure is monolithic but is comprised only of a single tens ion band in order to give maximum flexibility to the arches, which closes the tubular structure around this tension band. This tubular structure, being unbalanced from the radial offset of the single tension band, is rebalanced by the winding of one or more wires with the same pitch and same direction as the tension band of the monolithic tubular structure making contact with the arches directly or indirectly of the monolithic tubular structure to be able to withstand substantial tension loads.

It is also possible to seal the first tubular structure by vulcanising an elastomer in the slits. In this case the slits can have a no rectilinear form to increase the surface of contact and thus the width of shearing of the elastomer.

One can also form the first tubular structure by welding in spiral a thick band comprising slits of which the length is smaller than the width of the band laid out substantially perpendicular to the direction of the band. In this case it is advantageous to carry out the sealing by welding on the two edges, a corrugated thin sheet band having corrugation on a length smaller than the width of the band covering the slits area, on the thick band.

Finally one can conceive to carry out the first tubular structure by welding in spiral a single band on which corrugation folds have been formed by stamping directly the thick band and pushing the material along lines substantially perpendicular to the direction of the band but without going through the band.

Whereas this invention was illustrated by the three embodiments, it will appear to the man skilled in the art that it is not thus limited, but is likely to accept variations within the extent of the protection conferred by the claims.

The invention claimed is:

1. Multi-structure pipe of great flexibility (1, 10 or 20) intended to transport a fluid, including an assembly of at least two structures concentric to the axis of the pipe and means to contain the transported fluid, wherein said assembly of structures includes a first internal tubular structure (3, 12 or 22) having a set of substantially circumferential low pitch helical slits (5) bordering hoop resistant bands, each said slit extending on an arc of more than 180 degrees and less than 360 degrees in order to define a continuous opposite high pitch first tension load band (7, 11 or 21), and at least a second structure (13-15 or 23) having at least one other tension load band (6, 13 or 23) with a helix of same direction and pitch as said first tension load band (7, 11 or 21), and said other tension load bands (7-6, 11-13 or 21-23) of said structures are maintained to a fix distance from said first tension load band by support on the outside of said first internal tubular structure (3, 12 or 22) to provide the capacity in tension of the pipe.

2. Multi-structure pipe (1, 10 or 20) according to claim 1 wherein said means to contain the transported fluid (4, 18 or 24) are located inside one of said structures.

3. Multi-structure pipe (1, 10 or 20) according to claim 1 wherein the means of containing the transported fluid, comprise a sealed pipe (4, 14 or 24).

4. Multi-structure pipe (10 or 20) according to claim 3 wherein the pipe (14 or 24) includes a cylindrical conduit having corrugations (17) to improve its flexibility.

5. Multi-structure pipe (20) according to claim 4 wherein reinforcing helix shape wires (25) are located inside the helix groove formed by said corrugations.

6. Multi-structure pipe (1 or 10) according to claim 3 wherein the sealed pipe is located on the outside of the first tubular structure (2, 12 or 22).

7. Multi-structure pipe (20) according to claim 3 wherein the sealed pipe is placed inside the first tubular structure (22).

8. Multi-structure pipe (10) according to claim 1 wherein the means of containing the transported fluid, comprise a band, with corrugation lengths substantially equal to the slit length (5), welded on its two edges to said tension load band (11) of the first tubular structure.

9. Multi-structure pipe (1) according to claim 1 wherein said second structure is a tubular structure having a second set of substantially circumferential low pitch helical slits (5) bordering second set of hoop resistant bands, each said slits extending on an arc of more than 180 and less than 360 degrees in order to define a continuous opposite high pitch second tension load band (7, 11 Or 21).

10. Multi-structure pipe (10) according to claim 1 wherein said second structure (13-15) comprises a winded wire (15) with small pitch and opposite direction to the tension band (13).

11. Multi-structure pipe according to claim 1 wherein said first tubular structure is fabricated by helix welding of a metal strip comprising slits of length smaller than the width of said strip and substantially perpendicular to the direction of said strip.

12. Multi-structure pipe according to claim 1 wherein said slits do not go through the structure and are formed by stamping material, providing a sealed tubular structure.

* * * * *